Patented Apr. 12, 1927.

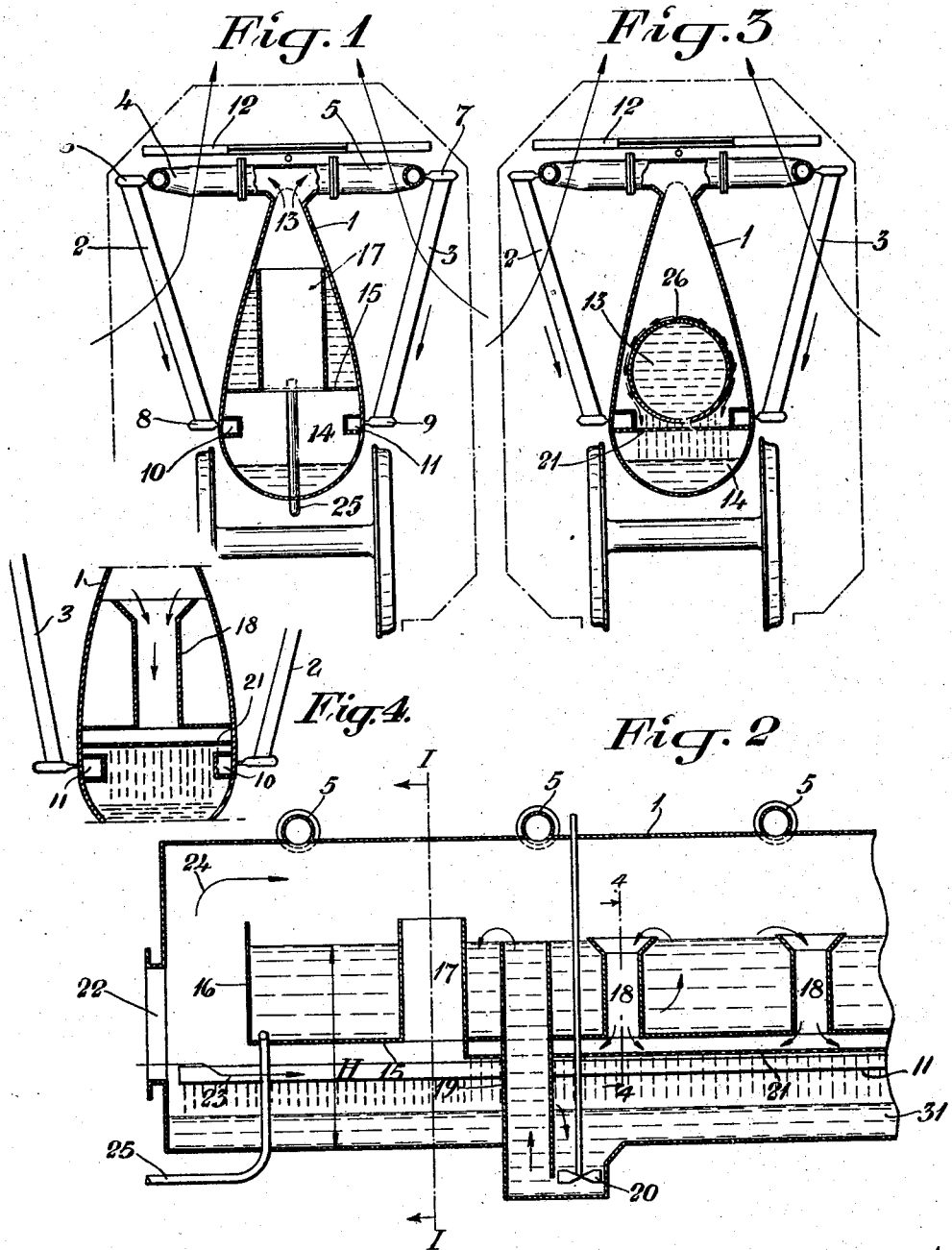

1,624,782

UNITED STATES PATENT OFFICE.

ERIK OTTO ERIKSSON, OF LIDINGO-BREVIK, SWEDEN, ASSIGNOR TO AKTIEBOLAGET LJUNGSTRÖMS ANGTURBIN, OF LIDINGO-BREVIK, SWEDEN, A CORPORATION.

CONDENSER FOR LOCOMOTIVES.

Application filed March 25, 1924, Serial No. 701,859, and in Sweden March 28, 1923.

Condensers for locomotives are known which consist of an air-cooled part and a fluid receptacle. Such a condenser works either in such manner that the supplied steam is condensed directly in the elements of the air-cooled part, the fluid receptacle serving as a steam accumulator working under vacuum, or in such manner that the fluid receptacle has the form of a water-cooled condenser of any known type, the cooling water being recooled in the air-cooled part. In the latter case the fluid receptacle has preferably the form of a mixing condenser, in which the water condenses the steam, while sprinkling down through the condenser and while in direct contact with the steam. Also in this case the liquid receptacle may be given an accumulating function by arranging it to contain so much water that the absorbed heat does not cause too high a rise in temperature of the water.

As the accumulating capacity of the fluid receptacle is directly proportional to the quantity of fluid, for instance water, contained in said receptacle, the receptacle has to be constructed in such manner that the greatest possible quantity of fluid may be carried. The elements of the air-cooled part are preferably arranged on either side of the fluid receptacle, and, as it is desired that the water may freely flow down from the elements into the receptacle, the height of the fluid or water in the receptacle has been determined by the places where said elements open into said receptacle. However, the quantity of fluid or water which may be contained in the receptacle below the said connecting places of the elements has proved insufficient for an advantageous accumulating capacity of the receptacle.

The object of the present invention is to dispose the said receptacle in such manner that it will be capable of containing the necessary quantity of accumulating liquid whilst maintaining an effective flow of the water or the stream. To this end, according to the invention, the receptacle is divided into two compartments containing liquid and located the one above the other.

The invention is shown in the annexed drawings. Fig. 1 shows a cross-section of a condenser according to the invention, taken on the line I—I of Fig. 2. Fig. 2 shows a longitudinal section of a part of the receptacle shown in Fig. 1. Fig. 3 shows a cross-section of another embodiment of the invention, and Fig. 4 is a section taken on the line 4—4 of Fig. 2.

According to the form of embodiment shown in Figs. 1 and 2 the condenser comprises a receptacle 1 and an air-cooled part which consists of elements 2 and 3 arranged in known manner at either side of the receptacle. Branch pipes 4 and 5 connect the top of the receptacle 1 with upper collecting chambers 6 and 7 for said elements 2 and 3, the lower collecting chambers 8 and 9 of which open into the receptacle 1, preferably into collecting pipes 10 and 11 placed inside the receptacle. Arranged above the receptacle 1 are one or more fans 12 which draw air between the elements 2 and 3 of the air-cooled part.

According to the invention the receptacle 1 is divided by a partition 15 into two compartments or chambers 13 and 14 situated the one above the other and both containing fluid, usually water. The upper compartment 13 is closed by end plates 16 (see Fig. 2) and connected with the lower compartment 14 of the receptacle by one or more pipes 17 and by one or more overflow pipes 18 provided in the upper compartment 13. Moreover the two compartments are connected by the discharge pipe of a pump 20.

Situated below the partition 15 separating the two compartments is a perforated diaphragm 21. In the form of embodiment shown the diaphragm 21 extends only over a part of the length of the receptacle.

The condenser shown is adapted for condensation of steam in the elements 2 and 3. The exhaust steam from the steam engine of the locomotive enters at 22 and passes either in the direction of the arrow 23 or in the direction of the arrow 24. The part of the steam passing in the direction of the arrow 23 is deprived of its heat by the water sprinkling down through the diaphragm 21, and the part of the steam passing in the direction of the arrow 24 passes through the branch pipes 4 and 5 into the elements 2 and 3 where it is condensed. The water of condensation is collected in the collecting pipes 10 and 11 and hence flows down into the lower compartment 14 of the receptacle 1. The water is forced by the pump 20 into the upper compartment 13 through the pipe 19. From this compartment 13 the water flows down through the over-flow pipes 18 to the diaphragm 21 and hence sprinkles down through the steam space of the lower compartment 14.

If a smaller quantity of steam is supplied to the condenser, the water in the receptacle will vaporize and will be condensed in the air cooled part. Thus, the receptacle will have an equalizing effect, so that the air-cooled part will be subjected to a load approximately constant and independent of the quantity of the exhaust steam from the steam engine of the locomotive.

Obviously, the water contained in the elements will, when the condenser is out of action, flow by itself to the lower compartment 14 of the receptacle. This has proved to be quite necessary, since an air-cooled part filled with water is exposed to stoppage, and may hardly be repaired without the whole condenser being deprived of its water content. Besides, a great risk is always at hand in elements filled with water when the temperature is low, viz. that the water will freeze and split the elements.

By dividing the water space according to the invention into two compartments located the one above the other, it is possible to withdraw the condensate by means of the condenser pump from the upper compartment 13, thus obtaining a great increase of pressure for the said pump. If, as generally is the case, the locomotive is composed of two vehicles having the steam boiler arranged on the one vehicle and the condenser on the other, it has been heretofore necessary to arrange the feeding pump and the feed water preheating aggregate on the condenser vehicle, as the suction pipe of the pump became so large, that it could not be given the necessary flexibility, if said pump and preheater were placed on the boiler vehicle. According to the invention, however, it will be possible to make the flexible conduits for the water of condensation between the two vehicles so small that the feeding pump and the preheater aggregate may be placed on the boiler vehicle, the increased pressure height H in the suction pipe 25 of the pump from the water space being used to overcome the increased pipe resistance thus occurring.

The form of embodiment shown in Fig. 3 differs from that shown in Figs. 1 and 2 in this that the upper water compartment 13 of the receptacle 1 has the form of an inner vessel arranged within the receptacle shell. The said vessel or compartment is, as described above, in communication with the lower compartment 14 by means of pumps. The compartment 13 is always filled with water, which is discharged from the said compartment through a longitudinal slit 26 located in its upper part, the water flowing over the outer sides of the vessel and dropping down to the diaphragm 21 located below the vessel, where it is distributed in the manner described above and sprinkles down through the steam chamber. By this means a better steam condensation is obtained. The inner vessel 13, which is constantly besprinkled with water, will be cooled in the same manner as an evaporating condenser. The steam passes through the different parts of the condenser in the manner described above. The inner vessel 13 may be given a flat shape in the vertical direction, it being possible to place two or more of such vessels side by side or one above the other.

Besides the fact of having obtained, according to the invention, an increased accumulating capacity of the condenser aggregate, and, thus, a decrease of the length, it has also been possible to decrease the width of the condenser. According to the invention, it is possible, as has proved necessary in large locomotives, to form the fluid receptacle in such manner that its width does not exceed the distance between the wheels, so that the required quantity of cooling air may pass on the side of the receptacle within the limits of the loading gauge.

Several modifications of the invention may be constructed without departure from the scope of the invention. Thus, it is possible to give the compartments of the fluid receptacle the appearance, which is most advantageous in each particular case.

What I claim as new and desire to secure by Letters Patent of the United States of America is:—

1. A condenser for locomotives or similar vehicles comprising a receptacle and an air-cooled part cooperating with said receptacle, the receptacle being divided into two compartments located the one above the other and serving both as liquid spaces.

2. A condenser for locomotives and similar vehicles, comprising a receptacle serving as a liquid space and an air-cooled part co-operating with said receptacle, the receptacle being divided into two compartments for containing liquid and located the one above the other, a pump to lift the liquid from the lower into the upper compartment and an over-flow pipe in said upper compartment through which the liquid may flow into the lower compartment.

3. A condenser for locomotives and similar vehicles, comprising a receptacle serving as a liquid space and an air-cooled part consisting of spaced elements, the receptacle being divided into two compartments for containing liquid and located the one above the other, the elements of the air-cooled part opening at the bottom into the receptacle below the upper compartment but above the liquid level of the lower compartment.

In testimony whereof I affix my signature.

ERIK OTTO ERIKSSON.